US011264011B2

(12) United States Patent
Rotem et al.

(10) Patent No.: US 11,264,011 B2
(45) Date of Patent: *Mar. 1, 2022

(54) SYSTEMS AND METHODS FOR EMPLOYING PREDICATION IN COMPUTATIONAL MODELS

(71) Applicant: Facebook, Inc., Menlo Park, CA (US)

(72) Inventors: Nadav Rotem, Santa Clara, CA (US); Abdulkadir Utku Diril, Menlo Park, CA (US); Mikhail Smelyanskiy, Burlingame, CA (US); Jong Soo Park, Mountain View, CA (US); James Kenneth Reed, Redwood City, CA (US)

(73) Assignee: Facebook, Inc., Menlo Park, CA (US)

(*) Notice: Subject to any disclaimer, the term of this patent is extended or adjusted under 35 U.S.C. 154(b) by 79 days.

This patent is subject to a terminal disclaimer.

(21) Appl. No.: 16/749,328

(22) Filed: Jan. 22, 2020

(65) Prior Publication Data

US 2020/0160848 A1 May 21, 2020

Related U.S. Application Data

(63) Continuation of application No. 15/857,990, filed on Dec. 29, 2017, now Pat. No. 10,553,207.

(51) Int. Cl.
*G10L 15/16* (2006.01)
*G10L 15/18* (2013.01)
(Continued)

(52) U.S. Cl.
CPC ............ *G10L 15/16* (2013.01); *G06N 3/0445* (2013.01); *G10L 15/18* (2013.01); *G10L 15/22* (2013.01)

(58) Field of Classification Search
CPC ......... G10L 15/16; G10L 15/18; G10L 15/22; G06N 3/0445
See application file for complete search history.

(56) References Cited

U.S. PATENT DOCUMENTS 9,799,327 B1 10/2017 Chan et al.
10,553,207 B2 2/2020 Rotem et al.
(Continued)

OTHER PUBLICATIONS

Campos, Skip RNN: Learning to Skip State Updates in Recurrent Neural Networks, Aug. 22, 2017, arXiv, whole document (Year: 2017).*

(Continued)

*Primary Examiner* — Sonia L Gay
(74) *Attorney, Agent, or Firm* — FisherBroyles, LLP

(57) ABSTRACT

The disclosed method may include (1) determining whether a next operation of a plurality of operations of an artificial neural network (ANN) is dependent upon a Boolean predication value based on a representative value for a weight or an input of a node of the ANN, (2) based on the next operation not being dependent on the Boolean predication value, allowing the next operation to update a state of the ANN, and (3) based on the next operation being dependent on the Boolean predication value, performing at least one of (a) allowing, based on the Boolean predication value being a first value, the next operation to update the state of the ANN, and (b) preventing, based on the Boolean predication (Continued)

value being a second value different from the first value, the next operation from updating the state of the ANN. Various other methods and systems are also disclosed.

20 Claims, 11 Drawing Sheets

(51) Int. Cl.
  *G10L 15/22* (2006.01)
  *G06N 3/04* (2006.01)

(56) References Cited

U.S. PATENT DOCUMENTS

| | | | |
|---|---|---|---|
| 2003/0212881 A1 | 11/2003 | Walterscheidt et al. | |
| 2013/0297918 A1 | 11/2013 | Goel et al. | |
| 2017/0206405 A1 | 7/2017 | Molchanov et al. | |
| 2018/0101767 A1 | 4/2018 | Huang et al. | |
| 2018/0121377 A1* | 5/2018 | Woo | G06N 3/10 |
| 2018/0136877 A1 | 5/2018 | Ouyang et al. | |
| 2018/0285715 A1 | 10/2018 | Son et al. | |
| 2020/0110988 A1* | 4/2020 | Wang | G06N 3/02 |

OTHER PUBLICATIONS

Non-Final Office Action received for U.S. Appl. No. 15/857,990 dated Nov. 30, 2018, 61 pages.
"Recurrent neural networks and LSTM Tutorial in Python and Tensor Flow", Adventures in Machine Learning, Oct. 9, 2017, 32 pages.
Final Office Action received for U.S. Appl. No. 15/857,990 dated Jun. 13, 2019, 22 pages.
Notice of Allowance received for U.S. Appl. No. 15/857,990 dated Sep. 25, 2019, 12 pages.
Artificial Neural Networks: A Tutorial, Anil K. Jain and Jianchang Mao, IEEE Computer Magazine (Mar. 1996), pp. 31-44.
Predication (computer architecture), Wikipedia, last modified Oct. 29, 2017, accessed Dec. 7, 2017 at https://en.wikipedia.org/wiki/Predication_(computer_architecture).
Predication, accessed at <https://www.cs.nmsu.edu/~rvinyard/itanium/predication.htm> on Dec. 8, 2017.
Standards for Vision Processing and Neural Networks, Giduthuri, Radhakrishna, as accessed on Dec. 8, 2017.

* cited by examiner

SYSTEMS AND METHODS FOR EMPLOYING PREDICATION IN COMPUTATIONAL MODELS

CROSS REFERENCE TO RELATED APPLICATION

This application is a continuation of U.S. patent application Ser. No. 15/857,990, filed Dec. 29, 2017, the disclosure of which is incorporated herein, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
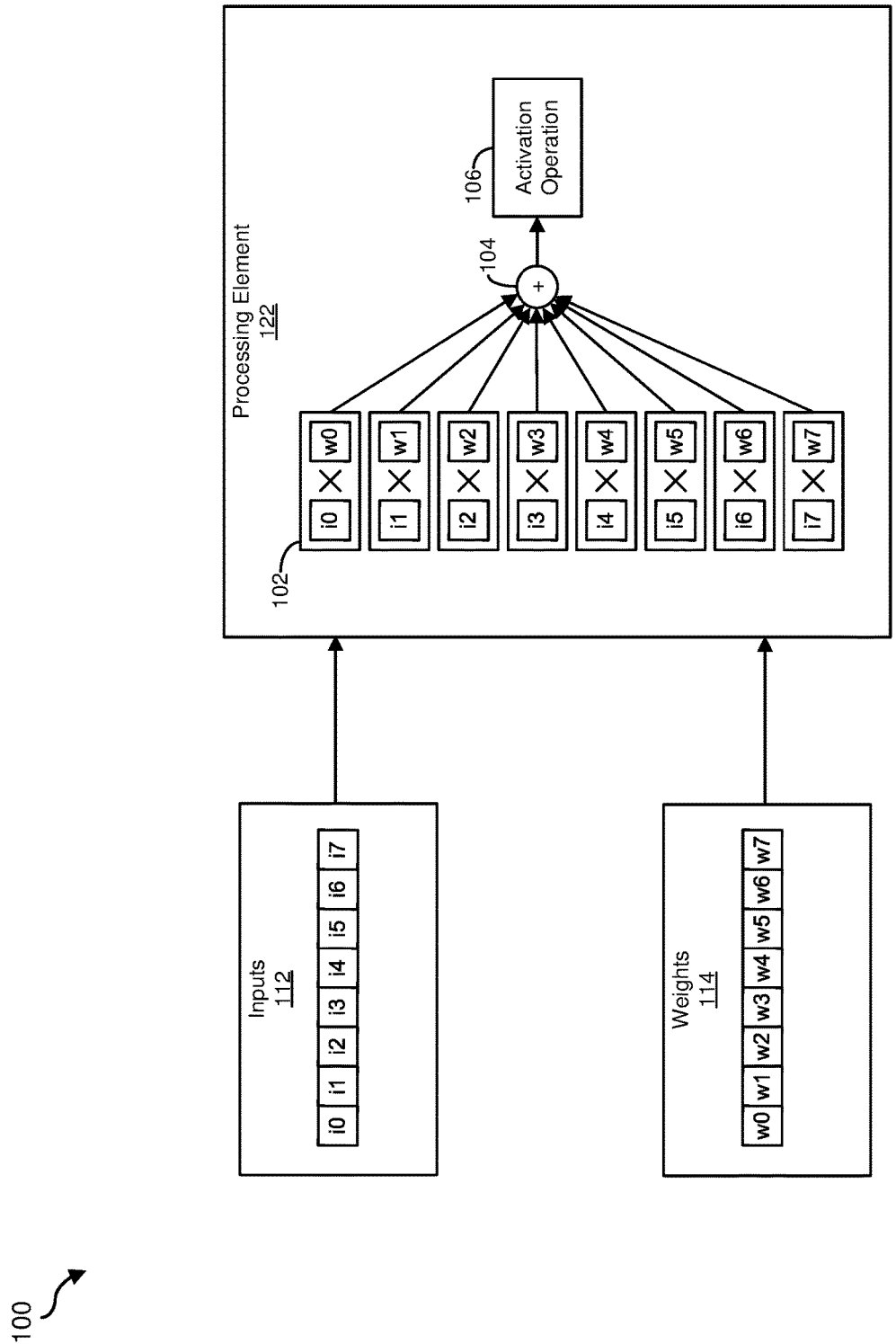
FIG. 1 is a dataflow diagram of operations executed by an exemplary subsystem including a processing element with associated inputs and weights for a computational model.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Artificial intelligence (AI) can enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

Some machine learning systems naturally lend themselves to be compiled for execution on static (e.g., unchanging and/or unconditional) processing structures. One machine learning model, referred to as an artificial neural network (ANN), is inspired by the interconnections of neurons in a biological brain. Typically, ANNs include multiple computational nodes arranged in interconnected layers, with each node modeling a neuron that may receive one or more inputs, process the inputs, and pass an output to the next layer, with the final layer producing a desired output. Some ANNs are easily compiled into directed acyclic graphs (DAGs) implemented by a group of processing elements on general-purpose or special-purpose hardware. Unlike many types of computer algorithms, DAGs typically do not implement execution loops, conditional branches, or the like.

However, some ANNs and other machine learning systems are best represented by processing networks that include the more complex looping and branching structures noted above. For example, a class of ANNs called recurrent neural networks (RNNs) employ execution loops, such as by forwarding an output of one layer to the same layer and/or a preceding layer. Such iterative processing is useful in some complex tasks. For example, natural language processing (NLP) (e.g., machine translation) networks often employ knowledge of sequential information, such as how many previous words encountered in a sentence may be used to translate the current word. To facilitate this capability, some information regarding the preceding words may be saved for subsequent processing of the current word. Such information is typically modeled by way of loops or other recurring constructs of an RNN.

To render the resulting RNN more efficient, neural network compilers may model at least some of the desired dynamic traits of an RNN into a more static network, which may be accomplished by "unrolling" looping constructs into a series of similar neural layers more commonly used in a DAG. One consequence of rendering such a loop in a static manner is that early termination of the loop, which may be desirable under certain circumstances (e.g., in machine translation, if the end of the current sentence is encountered), may be difficult without some type of conditional execution, such as a branch in the network.

The present disclosure is generally directed to systems and methods for employing predication in a computational model. As will be explained in greater detail below, embodiments of the instant disclosure may facilitate the implementation of conditional logic (e.g., if-then branches, conditional loops, etc., such as those that may form cyclic dataflows in computational models (e.g., RNNs)) in unidirectional computational models (e.g., DAGs). By providing such capability, compilers that generate unidirectional models, which are typically more efficient at providing parallelization (e.g., concurrent execution of multiple operations) than models that incorporate loops and conditional branches, may incorporate conditional logic efficiently, thus extending the types of computational models (e.g., machine translation) that may be implemented effectively using unidirectional models.

Figure 8:
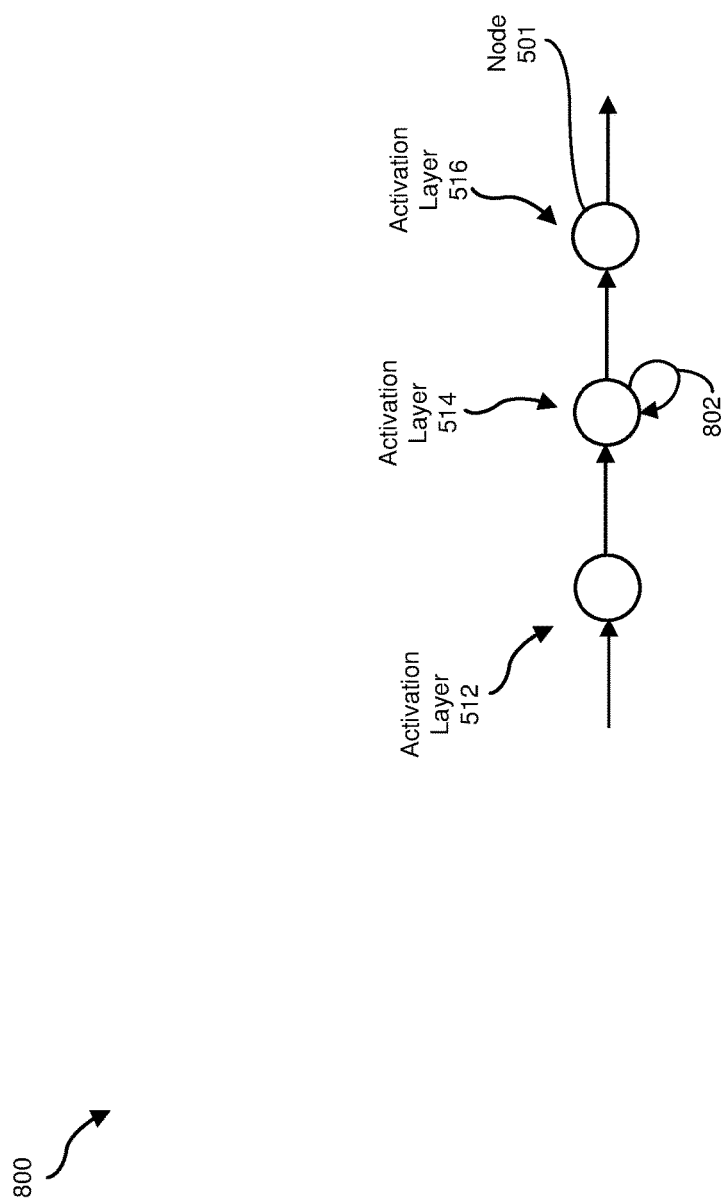
FIG. 8 is a diagram of nodes within a recurrent neural network (RNN) having a loop logic structure.
Figure 9:
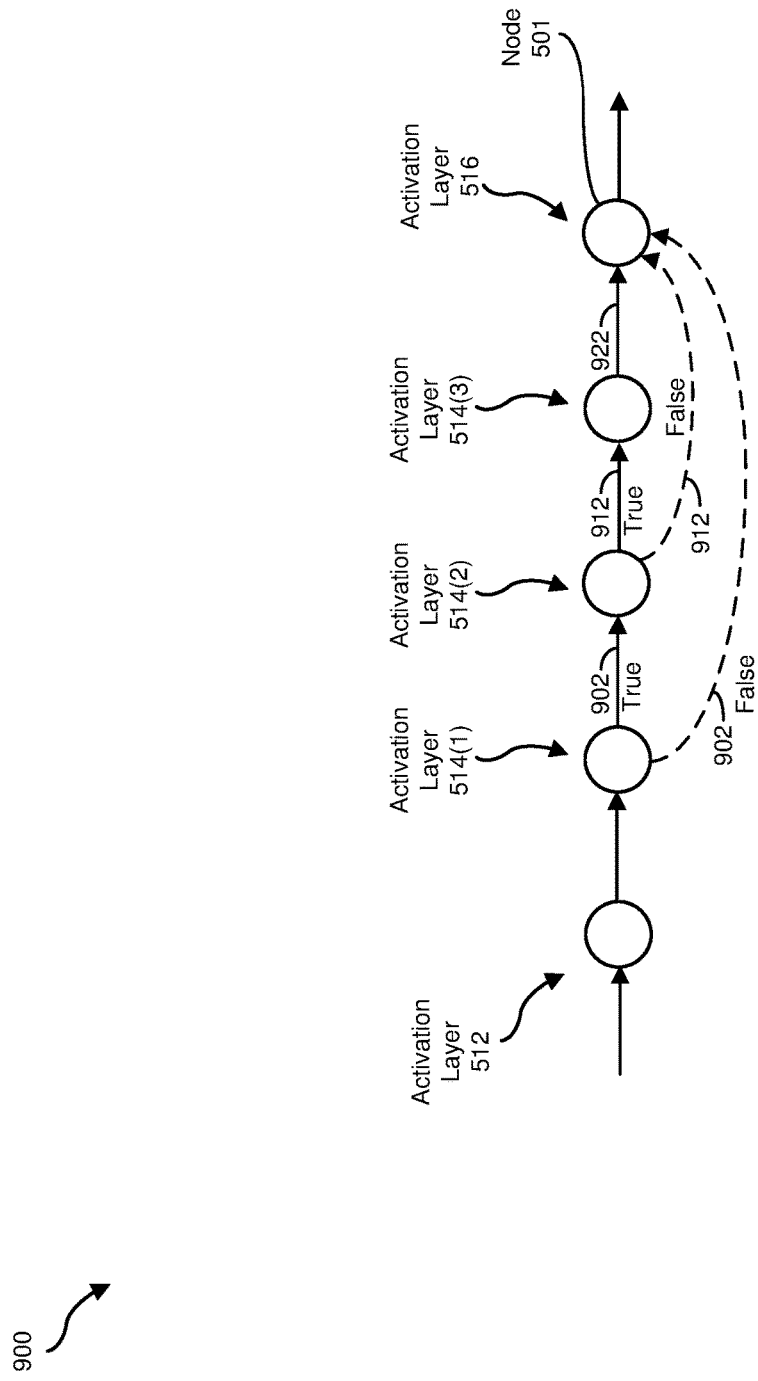
FIG. 9 is a diagram of nodes within a DAG derived from an RNN, where the DAG employs an "unrolled" loop that includes predication logic to conditionally terminate the loop.
Figure 10:
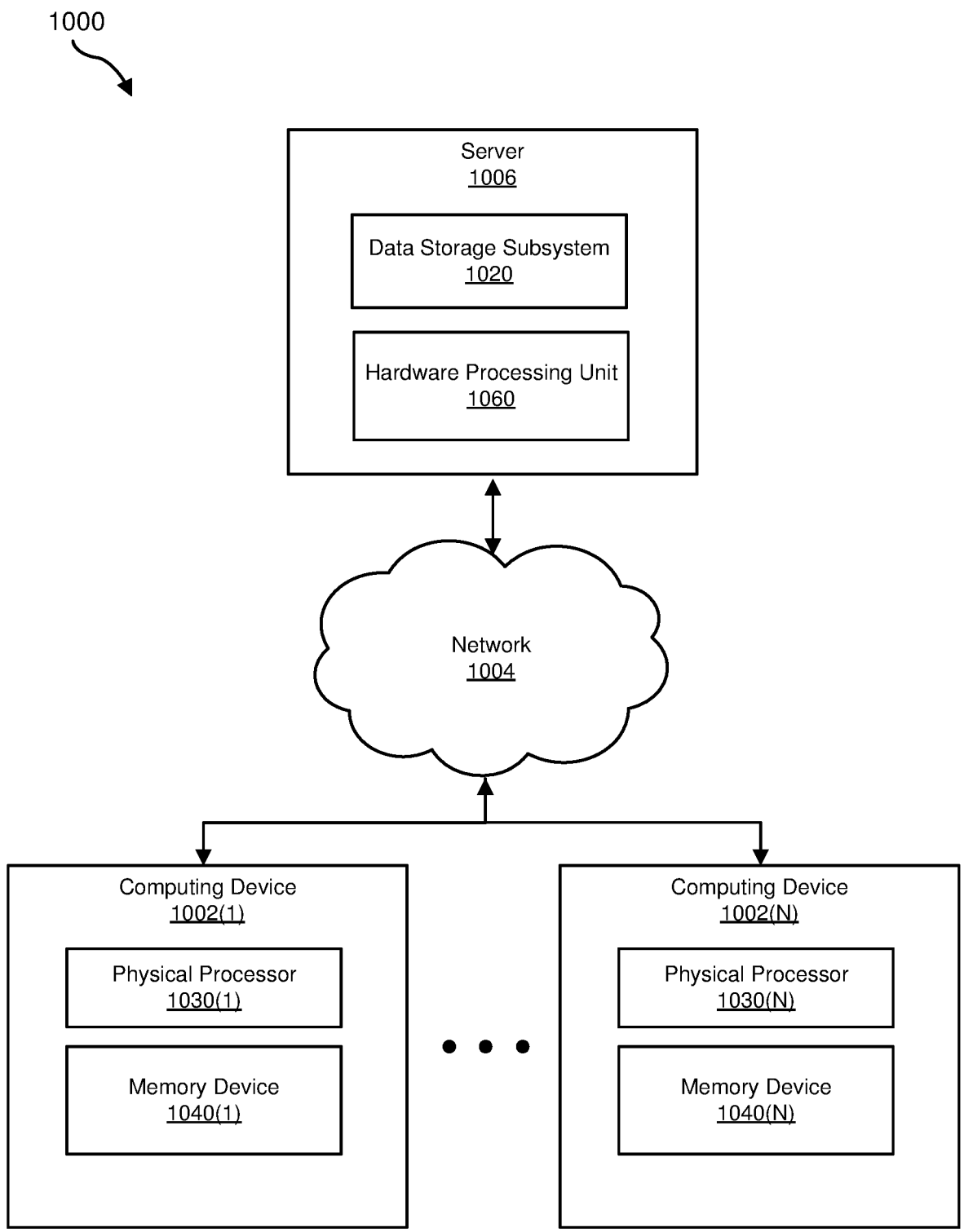
FIG. 10 is a block diagram of an exemplary system in which processing elements employing predication may be included.

The following will provide, with reference to FIGS. 1-11, detailed descriptions of systems and methods for employing predication in computational models. Multiply-accumulate (or dot-product) operations typically expected of a subsystem that includes a processing element are discussed below in conjunction with FIG. 1. Descriptions of various embodiments of processing elements that may employ predication logic are provided in connection with FIG. 2. An exemplary hardware accelerator employing multiple processing elements using predication is discussed below in conjunction with FIG. 3. A discussion of an exemplary method of employing predication in a computational model is provided in association with FIG. 4. The following also provides, with reference to FIG. 5, a discussion of exemplary neural networks that may leverage processing elements. The description of FIGS. 6-9 is directed to exemplary diagrams of nodes of a neural network depicting various conditional flows that may be implemented using predication. The description of FIG. 10 is directed to an exemplary system in which processing elements using predication may be implemented. Also, with reference to FIG. 11, the following disclosure presents an example of a computing system in which multiple processing elements of FIG. 1, such as in the form of the accelerator of FIG. 3, may be installed.

FIG. 1 is a dataflow diagram illustrating operations executed by a subsystem 100 for a node of a computational model that receives multiple inputs 112 and associated mathematical weights 114 provided to a processing element 122 for processing. In some examples described in greater detail herein, the computation model may be an artificial neural network (ANN), or more colloquially, a neural network. However, other types of computational models in which a large number of computational resources, such as processing elements 122, are employed to analyze a complex set of inputs (e.g., visual inputs, audio inputs, and so on) may benefit from use of processing elements 122 in other embodiments. Moreover, such computational models may include other types of machine learning systems and other forms of artificial intelligence, as well other types of systems not associated with artificial intelligence.

In the example of FIG. 1, for a particular node of the computational model, each of eight inputs 112 (e.g., i0, i1, i2, i3, i4, i5, i6, and i7) may be associated with a corresponding weight 114 (e.g., w0, w1, w2, w3, w4, w5, w6, and w7). While eight inputs 112 and associated weights 114 are discussed in this particular example, any number of inputs 112 and corresponding weights 114 may be used in other examples, and such numbers may vary from node to node in the computational model.

As shown in FIG. 1, processing element 122 may perform a multiplication operation 102 on each input-weight pair (e.g., i0×w0, i1×w1, i2×w2, and so on) and accumulate (e.g., sum) or otherwise combine the resulting products of multiplication operations 102 by way of an accumulate operation 104. In some examples, processing element 122 may employ the resulting sum from accumulate operation 104 as input to an activation operation 106. Examples of activation operations include, but are not limited to, Rectified Linear Unit (ReLU), Softsign, Inverse Square Root Unit (ISRU), and so on. In other examples, processing element 122 may not include an activation operation. Also, in some examples, a function or operation other than accumulate operation 104 may be employed in conjunction with multiplication operations 102 in some computational models.

In some embodiments, one or both of inputs 112 and weights 114 may each represent a vector, such as a row or column of a two-dimensional matrix (or portions thereof). As a result, multiplication operations 102 and accumulate operation 104 may be employed as vector-vector (or more broadly, matrix-matrix) computations, such as dot-product operations that may be employed for image recognition and other high-complexity tasks.

The term "dot product," in some examples, may generally refer to any algebraic operation that processes two sequences of numbers and returns a single number. In other words, a dot product may be a sum of the products of corresponding entries of two different number sequences or vectors. Alternatively, while the dot-product calculations discussed herein are presented primarily in algebraic terms, a dot product may also be described geometrically in terms of angle and distance (i.e., in terms of the magnitude of vectors). In some contexts, a dot product may be referred to as a scalar product or an inner product. In some embodiments, dot-product operations may also be performed in the context of three-dimensional matrices and/or one-dimensional matrices (e.g., individual vectors).

In some examples described in greater detail below, one or more operations 102, 104, and 106, as well as other operations employed within a computational model, may be made conditional by use of predication within processing element 122. In some embodiments, the term "predication" may refer to the use of a Boolean value as a predicate for an operation such that the performance of the operation, or the effect of the operation on the state of the computational model, depends on the Boolean value. In some examples, performance of an operation, or the effect of that operation (when performed), may occur only if a particular Boolean value is true, or only if a particular Boolean value is false. Consequently, systems that employ predicated operations may not use explicit comparisons of variables in conjunction with conditional branching around other operations based on those comparisons to implement branch conditions, loop termination conditions, and the like. Instead, predicated operations may be listed in series without employing branch conditions.

For example, "if-then-else" conditional logic may be implemented by way of an operation that sets a particular Boolean predication value, followed by one or more operations that are performed based on the Boolean predication value being true, followed by one or more operations that are performed based on the Boolean predication value being false, possibly followed one or more operations that are performed regardless of the Boolean predication value. Consequently, conditional branches that skip over one or more operations based on some branch condition may not be needed in such examples.

In some embodiments, predicated operations may be distributed among multiple processors or operational units to facilitate parallel execution. As a result, a predicated operation may be available for execution prior to an associated Boolean predication value for the operation being determined. In such examples, the operation may be performed, and the results of the operation saved temporarily until the Boolean predication value is generated (e.g., by performance of a previous operation), after which the state of the computational model may be updated using the saved result if the Boolean predication value indicates so.

Figure 2:
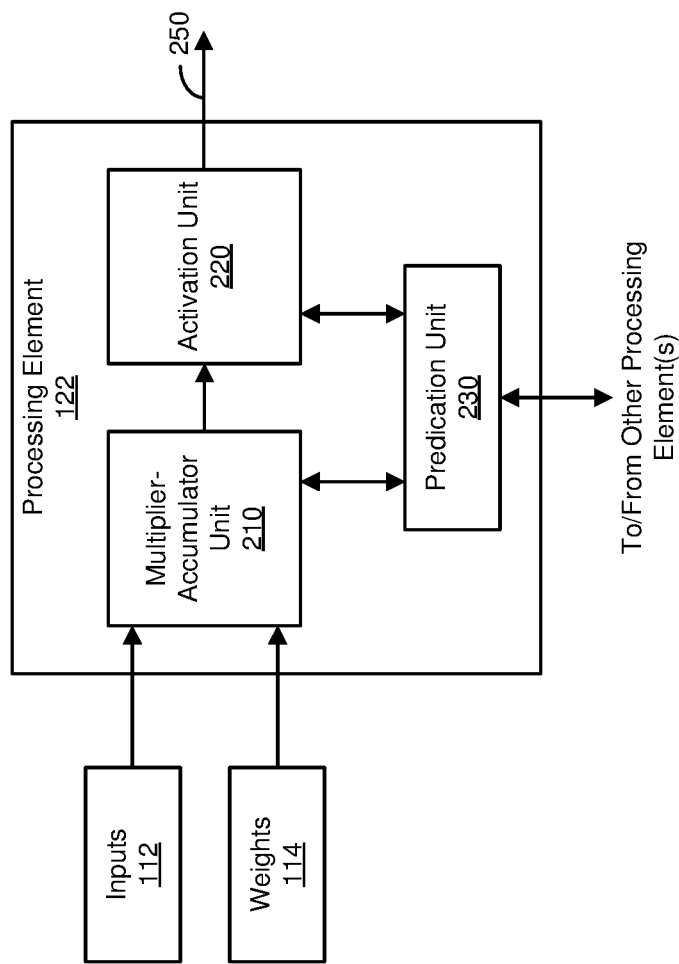
FIG. 2 is a block diagram of an exemplary processing element employing predication logic.

FIG. 2 depicts an embodiment of processing element 122 in which weights 114 and associated inputs 112 are received at a multiplier-accumulator unit 210, which may perform multiply operations 102 and accumulate operation 104 of FIG. 1. Processing element 122 may also include an activation unit 220 that applies an activation operation (e.g., activation operation 106) to the sum or other accumulated result from multiplier-accumulator unit 210 to produce an output 250 for processing element 122. In other embodiments, additional and/or different operation units other than those illustrated in FIG. 2 may be employed to process weights 114 and associated inputs 112 to produce output 250.

Additionally, processing element 122 may include a predication unit 230 that may communicate with multiplier-accumulator unit 210, activation unit 220, and/or other units of processing element 122 so that a Boolean predication value may determine the performance and/or model effect of one or more operations of processing element 122, as discussed above. In some embodiments, predication unit 230 may control the performance and/or effect of any type of operation possibly performed in processing element 122.

In some embodiments, predication unit 230 may compare the value of a weight 114 to some comparison value (e.g., a threshold) to set a Boolean predication value for a subsequent operation (e.g., a multiplication operation 102). Based on weight 114 being greater than or equal to the comparison value, predication unit 230 may allow the result of the subsequent operation, when performed, to update the state of the computation model. If, instead, weight 114 is less than the comparison value, predication unit 230 may prevent either performance of the subsequent operation (if such performance has not already occurred) or prevent a result of the performance of the subsequent operation from affecting the computational model state. In this case, presuming the subsequent operation is the multiplication of weight 114 and associated input 112, the resulting product may not be produced if weight 114 is less than the comparison value, or the resulting product may not be accumulated (e.g., summed) with products of other weights 114 and associated inputs 112 presented to processing element 122, thus not being used to update the state of the overall computational model.

In other embodiments, the absolute value of weight 114 may be compared to some comparison value to set a Boolean predication value (e.g., true or false) for controlling a subsequent operation. In such embodiments, presuming weight 114 may be positive or negative, only the absolute value of weight 114 being greater than or equal to the comparison value may allow a result of the subsequent operation to update or affect the current state of the computational model. In yet other examples, weight 114 may be compared to zero such that a subsequent operation may update the state of the computation model if weight 114 is not zero. In such examples, multiplication of a zero weight 114 with an associated input 112 may be prevented or ignored in the computational model.

Other embodiments of predication unit 230 may include, for example, comparing a weight-input product to some comparison value, and accumulating the product with others only if the product is greater than the comparison value. Other examples by which predication unit 230 may control or affect operation of processing element 122 are also possible. In some examples, use of predication unit 230 as described above may cause some operations having little possible effect on the state of the computation model to be prevented or ignored, thus possibly causing processing element 122 to operate more quickly and/or efficiently.

In yet other examples, predication unit 230 may generate a Boolean predication value based on the value of an input 112 provided to processing element 122, such as an activation value (e.g., resulting from activation operation 106 of another processing element 122). In some embodiments, predication unit 230 may set the Boolean predication value (e.g., true or false) based on whether input 112 is greater than or equal to some comparison value, whether the absolute value of input 112 is greater than or equal to a comparison value, whether input 112 is zero, and so on. Based on that Boolean predication value, one or more operations (e.g., multiply operation 102, accumulate operations 104, an/or activation operations 106) of processing element 122 may either be allowed to modify, or be prevented from modifying, the state of the computational model.

As indicated in FIG. 2, predication unit 230 may also communicate with one or more other processing elements 122. For example, predication unit 230 of current processing element 122 may receive a Boolean predication value from another processing element 122 (e.g., a processing element 122 that is processing another node of the computational model) that may control the effect that output 250 of that processing element 122 has on current processing element 122, that may control the effect that output 250 of current processing element 122 imparts on a subsequent processing element 122, or the like. In some embodiments, predication unit 230 may provide a Boolean predication value to another processing element 122 to control the effect of one or more operations of the other processing element 122. Other possible uses for information transmitted from or received by predication unit 230 are also possible.

Figure 3:
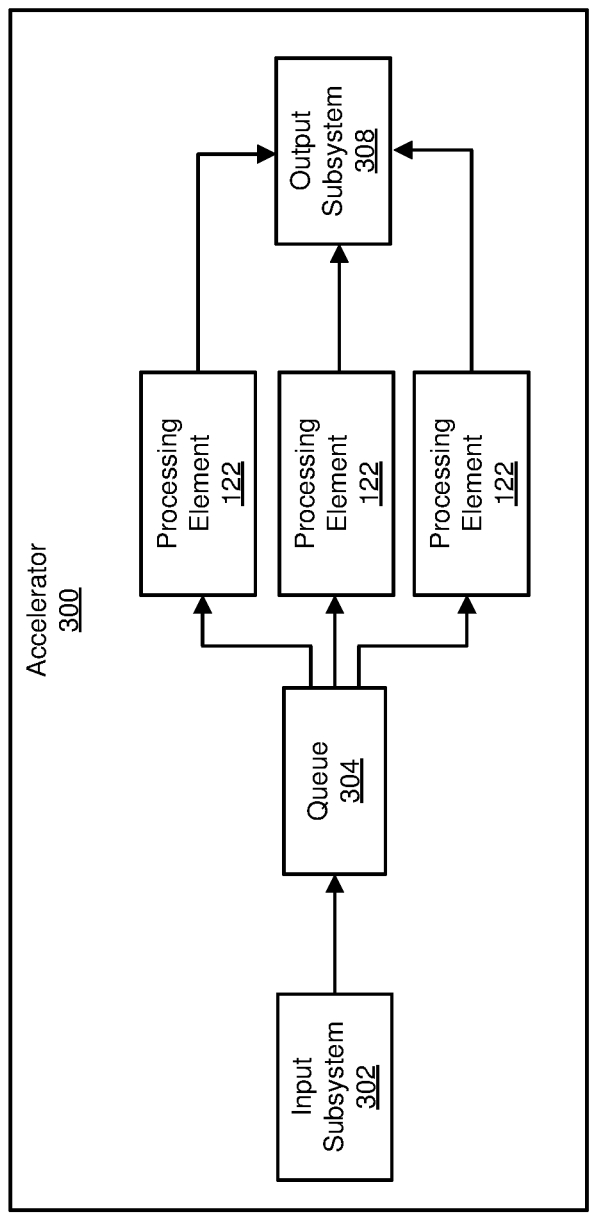
FIG. 3 is a block diagram of an exemplary hardware accelerator including multiple processing elements.

FIG. 3 illustrates a hardware accelerator 300 in which multiple processing elements 122 may be included to perform the various operations associated with the particular computational model to be employed. Accelerator 300 may include an input subsystem 302, at least one queue 304, multiple processing elements 122 (e.g., as shown in FIG. 2), and/or an output subsystem 308.

Input subsystem 302 and output subsystem 308 may generally represent one or more circuits, controllers, interfaces, busses, and/or other devices or systems for sending and/or receiving and/or processing data (e.g., inputs 112 and weights 114 of FIGS. 1 and 2) at accelerator 300. For example, in examples where accelerator 300 is installed in a computing system, input subsystem 302 may connect to a communication infrastructure to enable accelerator 300 to interact with other components of the computing system. An example of such a computing system is presented below in conjunction with FIG. 11. While shown as separate subsystems, input subsystem 302 and output subsystem 308 may be implemented as a single input/output (I/O) system.

Queue 304 may receive and queue data from input subsystem 302, and subsequently forward that data to processing elements 122 depending on the availability of each processing element 122. In some examples, queue 304 may provide all data for a particular node of a computational model to a currently idle processing element 122. While three processing elements 122 are depicted in FIG. 3, other examples may include more (e.g., tens, hundreds, or thousands) of processing elements 122.

Figure 4:
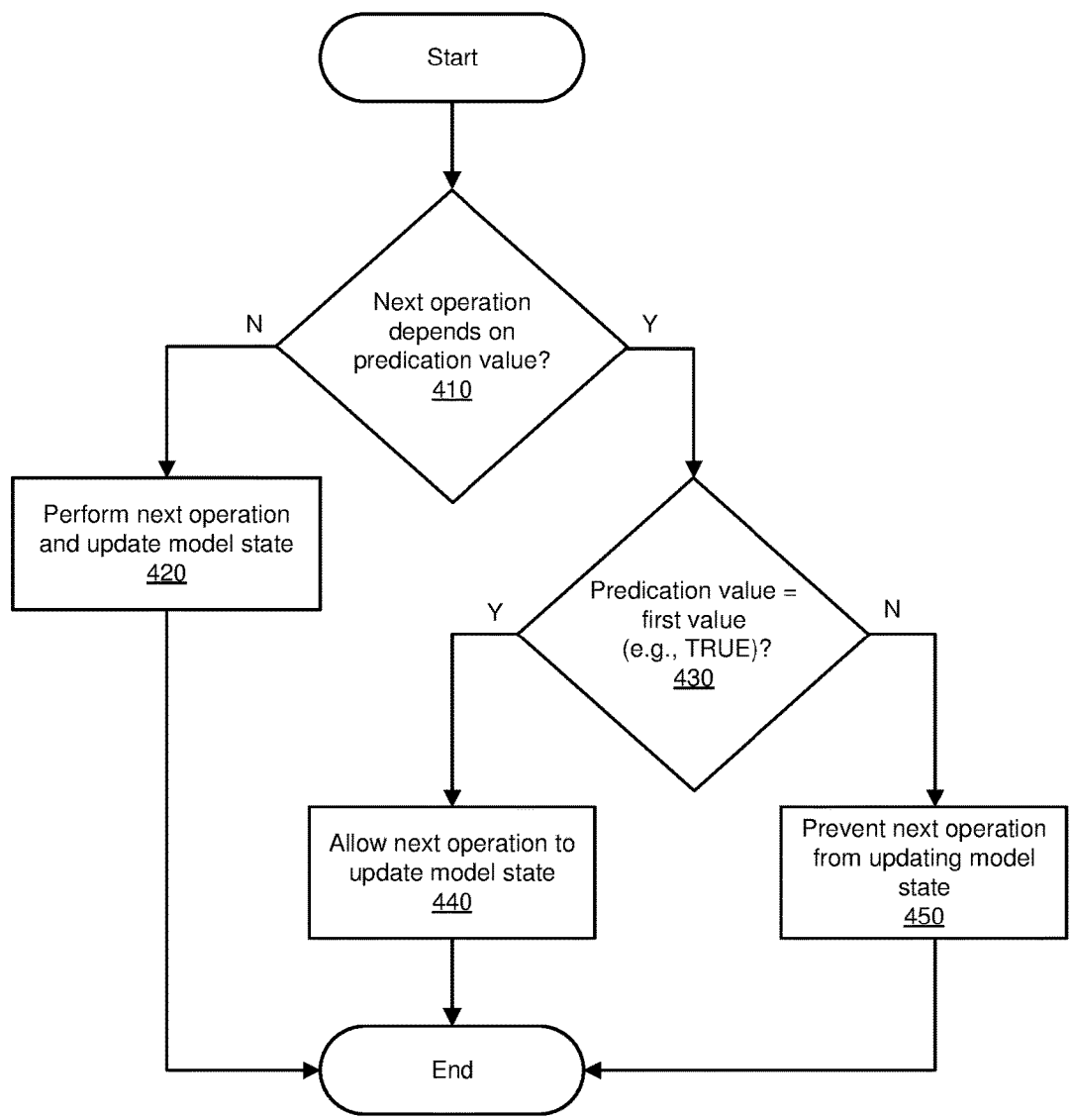
FIG. 4 is a flow diagram of an exemplary method for employing predication in a computational model.

FIG. 4 is a flow diagram of an exemplary method 400 for operating a processing element employing predication logic (e.g., processing element 122 of FIGS. 1 and 2, such as by using predication unit 230). In some embodiments, the steps shown for method 400 in FIG. 4 may be performed by processing elements 122 of a hardware accelerator (e.g., hardware accelerator 300 of FIG. 3), as described above. In some embodiments, at least some portions of method 400 may be performed by any suitable computer-executable code and/or computing system, including the system(s) illustrated in FIGS. 1-3 and 5-11. In one example, each of the steps shown in FIG. 4 may represent an algorithm whose structure includes and/or is represented by multiple sub-steps, examples of which will be provided in greater detail below.

Method 400, in some examples, describes a potential processing of a next operation of a computational model. As indicated above, such processing may be applied to multiple such operations (e.g., multiply operations 102, accumulate operations 104, activation operations 106, etc.), either within a particular processing element 122, or across multiple processing elements 122. At step 410, a determination may be made as to whether the next operation depends upon a Boolean predication value. If not, at step 420, the next operation may be performed, and the computational model may be updated using the result of the next operation. If, instead, the next operation depends upon the Boolean predication value, then at step 430, if the Boolean predication value is a first value (e.g., "true"), then at step 440, predication unit 230 may allow the next operation (e.g., by way of the result of performing the next operation) to update the state of the computational model. If, instead, the Boolean predication value is not the first value (e.g., "false"), then at step 450, predication unit 230 may prevent the next operation from updating the state of the computational model, such as by preventing the performance of the next operation, or by preventing a result of the next operation (e.g., if already performed) from affecting the computational model. In some embodiments, either step 440 or step 450 may be performed, depending on whether the Boolean predication value is equal to the first value. Also, in some examples, performance of a previous operation of a processing element 122 may cause the Boolean predication value to be generated (e.g., comparing a weight 114 to a threshold, comparing a product of a multiply operation 102 to a threshold, etc.), which may then be employed to control one or more subsequent operations.

Figure 5:
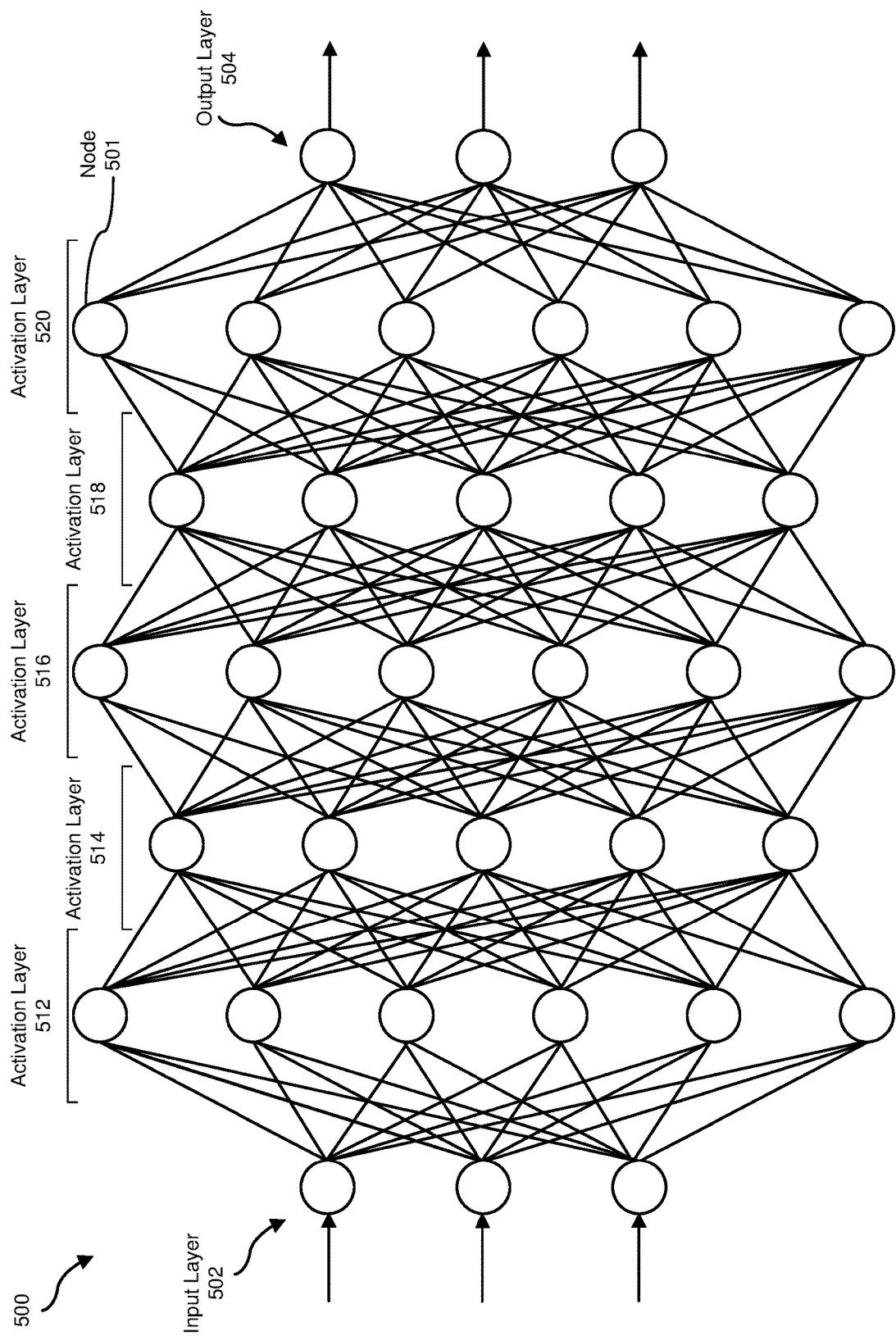
FIG. 5 is a diagram of nodes within an exemplary neural network in which predication may be employed.

The processing elements 122, possibly as implemented with hardware accelerator 300, as detailed above, may enable computing systems to realize the above-described benefits across a wide variety of computing tasks and workloads, including machine learning. FIG. 5 is a block diagram of an exemplary feed-forward neural network 500 capable of benefiting from one or more of the embodiments described herein. Neural network 500 may include an input layer 502, an output layer 504, and a series of five activation layers—activation layer 512, activation layer 514, activation layer 516, activation layer 518, and activation layer 520, with each layer including one or more nodes 501. While FIG. 5 provides an example with five activation layers, neural network 500 may include any other suitable number of activation layers (e.g., one activation layer, dozens of activation layers, thousands of activation layers, etc.).

In the example shown in FIG. 5, data flows from input layer 502 through activation layers 512-520 to output layer 504 (i.e., from left to right). As shown, network 500 is an example of a directed acyclic graph (DAG), as described above, in which loops are not employed and information flows in a single direction. Further, each value from nodes 501 of input layer 502 may be duplicated and sent to nodes 501 of activation layer 512. At activation layer 512, a set of weights (e.g., a filter) may be applied to the layer inputs, and each node may output a weighted sum to activation layer 514. This process may be repeated at each activation layer in sequence to create outputs at output layer 504.

Figure 6:
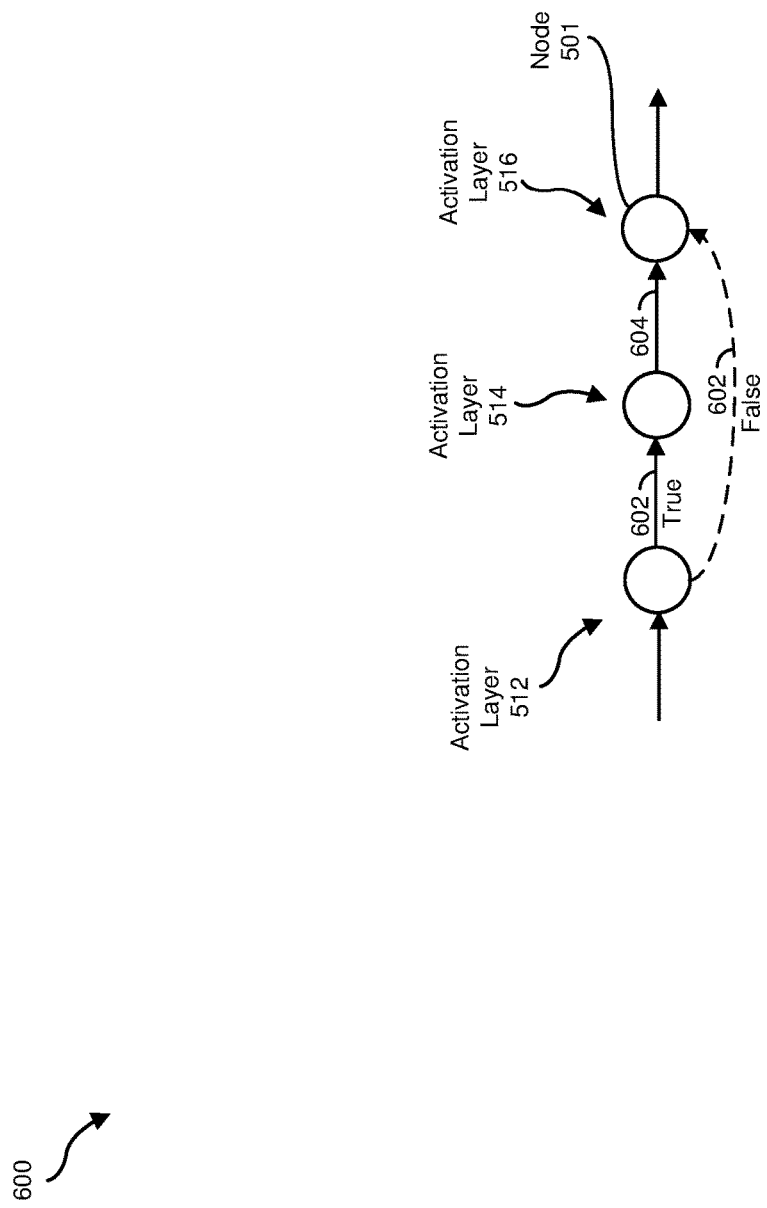
FIG. 6 is a diagram of nodes within a directed acyclic graph (DAG) in which predication is employed to conditionally skip an activation layer.

FIG. 6 illustrates various nodes 501 of a portion 600 of a DAG (e.g., network 500 of FIG. 5) in which predication may be employed to conditionally skip the operations of an activation layer (e.g., activation layer 514). In some examples, one or more operations within node 501 of activation layer 512 may generate output 602 to be used as input to node 501 of activation layer 514. In turn, node 501 of activation layer 514 may employ output 602 to generate a Boolean predication value upon which operations of node 501 of activation layer 514 may depend. Presuming the Boolean predication value is true, the operations of activation layer 514 (e.g., multiply operations 102, accumulate operation 104, and/or activation operation 106) may be performed using output 602 of node 501 of activation layer 512. Node 501 of activation layer 514 may then produce an output 604 for use as an input by node 501 of activation layer 516.

Presuming, instead, the Boolean predication value is false, node 501 of activation layer 514, in some examples, may pass output 602 directly to node 501 of activation layer 516, thus effectively skipping the operations provided in node 501 of activation layer 514 (e.g., as portrayed by the dashed line of FIG. 6) without actually circumventing node 501 of activation layer 514. In other examples, other types of output 604 (e.g., zero) may be provided from node 501 of activation layer 514 to node 501 of activation layer 516 in the case of the Boolean predication value being false.

Figure 7:
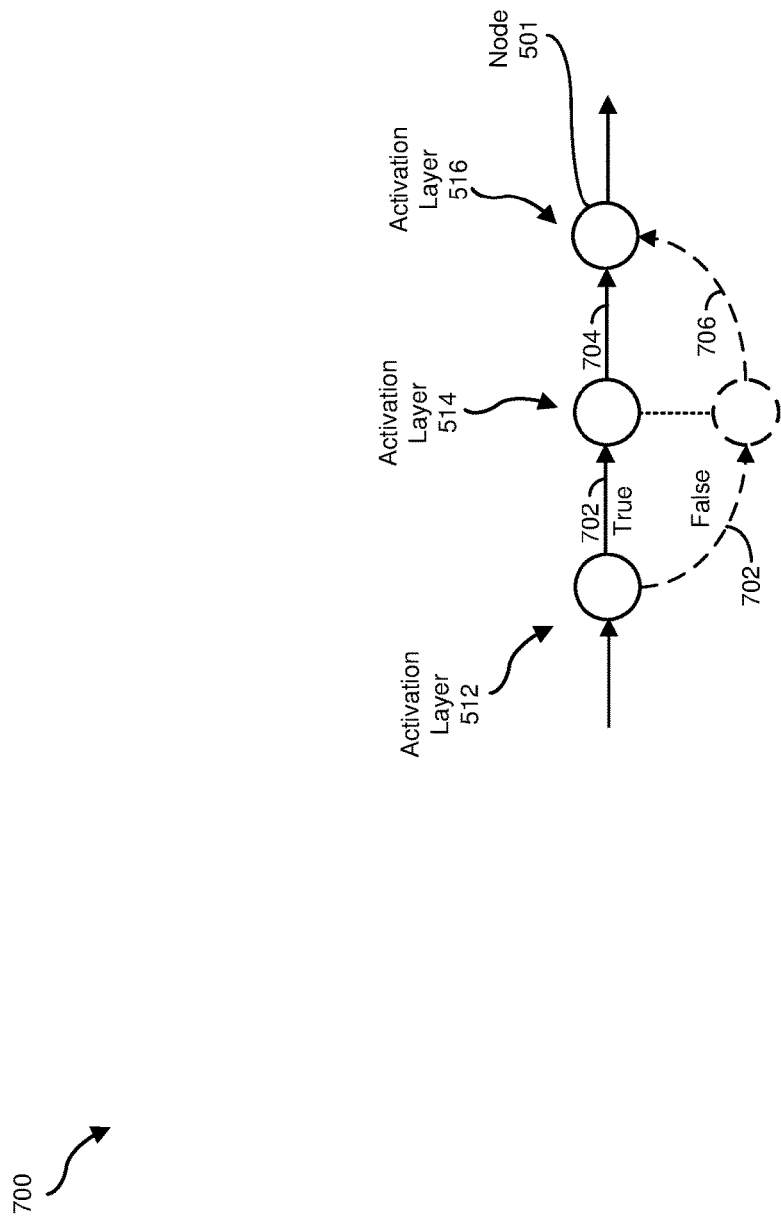
FIG. 7 is a diagram of nodes within a DAG in which predication is employed to provide an "if-then-else" logic structure.

FIG. 7 depicts nodes 501 of a portion 700 of a DAG (e.g., network 500 of FIG. 5) in which predication may be employed to provide an "if-then-else" logic structure. In some embodiments, one or more operations within node 501 of activation layer 512 may generate output 702 to be provided as input for node 501 of activation layer 514. In turn, node 501 of activation layer 514 may generate a Boolean predication value upon which operations of node 501 of activation layer 514 may depend. Presuming the Boolean predication value is true, some first subset of the operations of activation layer 514 may be performed using output 702 of node 501 of activation layer 512. Node 501 of activation layer 514 may then produce an output 704 for use as an input by node 501 of activation layer 516.

Presuming, instead, the Boolean predication value is false, node 501 of activation layer 514, in some examples, may perform some second subset of the operations provided within node 501 of activation layer 514 using output 702 of node 501 of activation layer 512. In that case, node 501 of activation layer 514 may produce an output 706 to be received as an input by node 501 of activation layer 516 (as indicated by the dashed lines of FIG. 7). Consequently, node 501 of activation layer 514 may serve as both the "then" and "else" branches of an "if-then-else" logic structure based on the Boolean predication value generated at node 501 of activation layer 512, which may serve as the "if" condition of that structure.

In either or both of the examples of FIGS. 6 and 7, in some embodiments, node 501 of activation layer 512 may generate the Boolean predication value (e.g., based on the value of output 602 or 702 from node 501 of activation layer 512) instead of node 501 of activation layer 514, and subsequently forward the Boolean predication value to node 501 of activation layer 514. Other variations regarding the generation of the Boolean predication value, as well as the control of operations based on the Boolean predication value, are also possible.

FIG. 8 shows nodes 501 of a portion 800 of a recurrent neural network (RNN), in which an output 802 of node 501 of activation layer 514 is returned to the same node as an input. In other examples, output 802 may be provided to some previous node (e.g., node 501 of activation layer 512). In some embodiments, such a return path or loop may be taken a predetermined number of times to employ results of previous inputs to the RNN for processing later inputs, such as the translation of previous words in a sentence may be utilized to help translate a subsequent word, as discussed above. In other examples, a fundamental sequence unit or "token" (e.g., each of the previous inputs and/or the associated output) may be an identifiable portion of a language other than a word, such as a word phrase, a portion of a word (e.g., a syllable or a phoneme), and so on.

The use of a return or loop path initially disqualifies the network as a DAG. Consequently, in some examples, a compiler may compile the RNN to at least partially "unroll" such a path to render at least that portion of the RNN as a DAG so that the compiler may better optimize execution of the network. FIG. 9 illustrates a portion 900 of a DAG corresponding to portion 800 of the RNN after such an unrolling operation of a compiler. In this example, activation layer 514 of FIG. 8 has been unrolled into three activation layers 514(1), 514(2), and 514(3), thus being acyclic in nature. In other embodiments, a loop may be further unrolled into a greater number of activation layers 514 (e.g., ten, twenty, or more) if a greater number of loop iterations are possible or likely. In the examples of FIG. 9, execution of all three activation layers 514(1), 514(2), and 514(3) may be inefficient if a resulting output 922 of the unrolled loop (e.g., from activation layer 514(3)) will not be significantly different from an output 902 of the first iteration of the loop (e.g., from activation layer 514(1)) or an output 912 of the second iteration of the loop (e.g., from activation 514(2)).

To facilitate early termination of the loop, activation layers 514(2) and/or 514(3) may use predication logic to essentially skip substantive operations within those layers, in a manner similar to that described above with respect to FIG. 6. More specifically, in some examples, node 501 of activation layer 514(2) may generate a Boolean predication value based on output 902 received from node 501 of activation layer 514(1). Based on the Boolean predication value being true, node 501 of activation layer 514(2) may process output 902 using one or more operations (e.g., multiply operations 102, accumulate operation 104, activation operation 106, and so on) within that node to generate output 912. If, instead, the Boolean predication value is false, node 501 of activation layer 514(2) may pass output 902 through as output 912 to node 501 of activation layer 514(3), thus essentially skipping the substantive operations of node 501 of activation layer 514(2).

Thereafter, activation layer 514(3) may generate a Boolean predication value based on output 912 received from node 501 of activation layer 514(2). Based on this latest Boolean predication value being true, node 501 of activation layer 514(3) may process output 912 using one or more operations within that node to generate output 922. If, instead, the Boolean predication value is false, node 501 of activation layer 514(3) may pass output 912 through as output 922 to node 501 of activation layer 516, thus skipping substantive operations of node 501 of activation layer 514 (3). Moreover, if node 501 of activation layer 514(2) previously passed output 902 through to node 501 of activation layer 514(3) as output 912, output 922 may have the same value as output 902.

Consequently, by employing predication logic in FIG. 9, as described above, an iterative loop may be terminated early (e.g., before all loops of the RNN have been performed, as is depicted by the dotted lines of FIG. 9) while employing a DAG without using explicit branching or other conditional paths in the network. In some embodiments, such as the natural language processing example discussed above, early termination of a loop or other recurrent structure based on some condition (e.g., reaching the end of a sentence, or encountering some other end-of-sequence token) may be accomplished using predication in this manner. More generally, in some embodiments, a neural network that employs a conditional search algorithm (e.g., a beam search, such as in the context of natural language processing) may terminate a branch of a frontier of the search based on some specified output or activation value (e.g., a probability that the current token has been correctly determined exceeding or falling below some comparison value; or encountering an end-of-sequence token, such as an end of a sentence, an end of a phrase, or the like). Such termination may be implemented by setting a Boolean predication value that may cause subsequent computations associated that branch of the search to be skipped. As a result, the effectiveness of a DAG may be combined with the efficiency of conditional operation execution.

As detailed above, various embodiments of a processing element employing predication logic (e.g., predication unit 230 of FIG. 2) may facilitate useful conditional logic structures, such as iterative loops, if-then-else branching, and so on, without explicitly providing for such paths within each node of a computational model and/or in the various paths linking the nodes of the model. Consequently, advantages often associated with the use of conditional logic structures, such as performing only those operations that are necessary to reach a desired result or conclusion (e.g., by terminating a loop when additional iterations of the loops would not be helpful) may be implemented in simplified network structures, such as DAGs, which are more efficiently processed using a set of processing elements (e.g., processing element 122 of FIGS. 1 and 2) using today's computational model compiler technology.

FIG. 10 illustrates an exemplary network environment 1000 (such as a social network environment) in which aspects of the present disclosure may be implemented. As shown, network environment 1000 may include a plurality of computing devices 1002(1)-(N), a network 1004, and a server 1006. In one example, server 1006 may host a social network or may be part of a system that hosts a social network. In this example, server 1006 may include one or more of the hardware accelerators described herein, such as hardware accelerator 300 of FIG. 3, which may serve as part of a hardware processing unit 1060. In some examples, hardware processing unit 1060 may also include one or general-purpose processors that execute software instructions. Additionally, in some examples, server 1006 may include a data storage subsystem 1020, which may store such instructions, possibly along with data (e.g., input and/or output data) processed by execution of those instructions. In some embodiments, data storage subsystem 1020 may also store data (e.g., input and/or output data) associated with one or more hardware accelerators.

Computing devices 1002(1)-(N) may each represent a client device or a user device, such a desktop computer, laptop computer, tablet device, smartphone, or other computing device. Each of computing devices 1002(1)-(N) may include a physical processor (e.g., physical processors 1030(1)-(N)), which may represent a single processor or multiple processors, and a memory device (e.g., memory devices 1040(1)-(N)), which may store instructions (e.g., software applications) or data.

Computing devices 1002(1)-(N) may be communicatively coupled to server 1006 through network 1004. Network 1004 may be any communication network, such as the Internet, a Wide Area Network (WAN), or a Local Area Network (LAN), and may include various types of communication protocols and physical connections.

As noted, server 1006 may host a social network, and in such embodiments, computing devices 1002(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 1006 may access data (e.g., data provided by computing devices 1002(1)-(N)) for analysis. For example, server 1006 may perform (using, e.g., hardware accelerator 300) various types of AI or machine-learning tasks on data. For instance, server 1006 may use AI or machine-learning algorithms to rank feeds and search results, to identify spam, pornography, and/or other misleading content, to perform speech recognition (e.g., to automatically caption videos), to automate translation from one language to another, to enable natural language processing, to enable computer vision (e.g., to identify objects in images, to turn panoramic photos into interactive 360-degree images, etc.), and/or to perform a variety of other tasks. In one example, by incorporating one or more of the hardware accelerators described herein (e.g., hardware accelerator 300), server 1006 may, when performing such tasks, realize the performance benefits and/or energy savings detailed above.

Embodiments of the instant disclosure may also be applied to various environments in addition to or instead of social networking environments. For example, the systems and methods disclosed herein may be used in video game development and game play (e.g., in reinforcement-learning techniques), to automate robotics tasks (e.g., grasping, stabilization, navigation, etc.), in medical research (e.g., genomics, cancer research, etc.), for autonomous vehicle navigation, and/or in any other suitable context.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer. In addition, while some of the examples herein are discussed in the context of AI hardware accelerators, aspects of the present disclosure may also be applied to other hardware processing systems in which convolution operations are required or useful.

Figure 11:
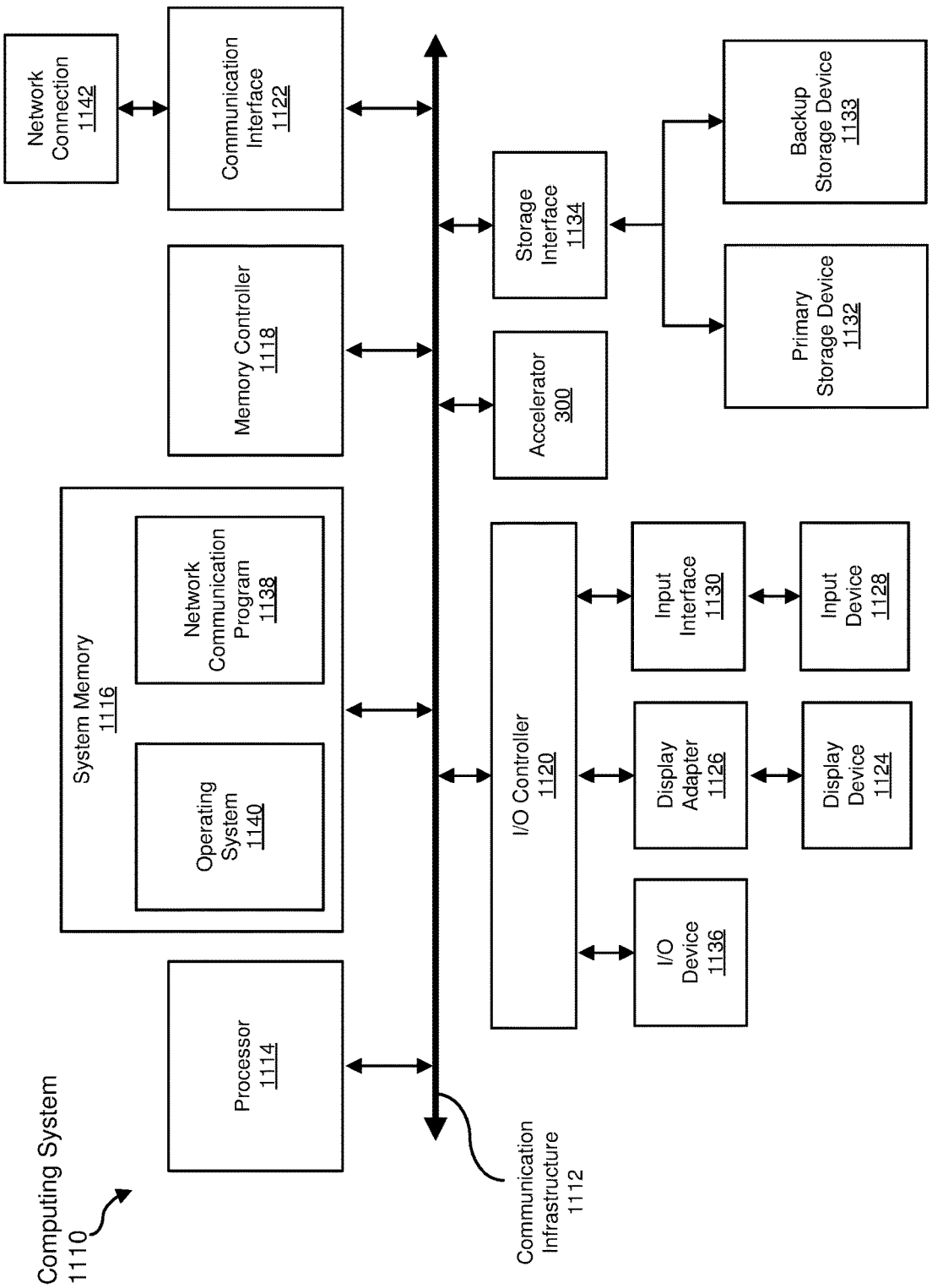
FIG. 11 is a block diagram of an exemplary computing system capable of implementing one or more of the embodiments described and/or illustrated herein.

As detailed above, the computing devices and systems described and/or illustrated herein broadly represent any type or form of computing device or system capable of executing computer-readable instructions. FIG. 11 is a block diagram of an exemplary computing system 1110 capable of incorporating and/or implementing one or more of the embodiments described and/or illustrated herein. Computing system 1110 broadly represents any single processor or multiprocessor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114, a system memory 1116, and one or more of the hardware accelerators described herein, such as hardware accelerator 300.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments, computing system 1110 may include both a volatile memory unit (such as, for example, system memory 1116) and a non-volatile storage device (such as, for example, primary storage device 1132, as described in detail below).

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments, memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments, I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to I/O controller 1120 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, variations or combinations of one or more of the same, and/or any other input device.

Additionally or alternatively, exemplary computing system 1110 may include additional I/O devices. For example, exemplary computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between exemplary computing system 1110 and one or more additional devices. For example, in certain embodiments, communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or application-specific integrated circuit (ASIC) incorporated in communication interface 1122.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an ASIC adapted to implement one or more of the exemplary embodiments disclosed herein.

EXAMPLE EMBODIMENTS

Example 1: A method that may include (1) setting, using at least one hardware processor, as a result of a previous operation of a plurality of operations of an artificial neural network (ANN), a Boolean predication value to a first value or a second value different from the first value, where the previous operation includes comparing a representative value for one of a weight or an input of a node of the ANN to a comparison value, (2) determining whether a next operation of the plurality of operations of the ANN is dependent upon the Boolean predication value, (3) allowing, based on the next operation not being dependent on the Boolean predication value, the next operation to update a state of the ANN, and (4) based on the next operation being dependent on the Boolean predication value, (a) allowing, based on the Boolean predication value being the first value, the next operation to update the state of the ANN, and (b) preventing, based on the Boolean predication value being the second value, the next operation from updating the state of the ANN.

Example 2: The method of Example 1, where (1) the representative value of the one of a weight or an input of the node may include an actual value of a weight of the node, and (2) the next operation may include a multiply operation of the actual value of the weight and a value of an input associated with the weight.

Example 3: The method of Example 1, where (1) the representative value of the one of a weight or an input of the node may include an actual value of an input of the node, and (2) the next operation may include a multiply operation of the actual value of the input and a value of a weight associated with the input.

Example 4: The method of Example 1, where (1) the representative value of the one of a weight or an input of the node may include an absolute value of a weight of the node, and (2) the next operation may include a multiply operation of an actual value of the weight and a value of an input associated with the weight.

Example 5: The method of Example 1, where (1) the representative value of the one of a weight or an input of the node may include an absolute value of an input of the node, and (2) the next operation may include a multiply operation of an actual value of the input and a value of a weight associated with the input.

Example 6: The method of Example 1, where (1) the representative value of the one of a weight or an input of the node may include an actual value of a weight of the node, and (2) the next operation may include an accumulate operation including a product of the actual value of the weight and a value of an input associated with the weight.

Example 7: The method of Example 1, where (1) the representative value of the one of a weight or an input of the node may include an actual value of an input of the node, and (2) the next operation may include an accumulate operation including a product of the actual value of the input and a value of a weight associated with the input.

Example 8: The method of Example 1, where (1) the representative value of the one of a weight or an input of the node may include an absolute value of a weight of the node, and (2) the next operation may include an accumulate operation including a product of an actual value of the weight and a value of an input associated with the weight.

Example 9: The method of Example 1, where (1) the representative value of the one of a weight or an input of the node may include an absolute value of an input of the node, and (2) the next operation may include an accumulate operation including a product of an actual value of the input and a value of a weight associated with the input.

Example 10: The method of Example 1, where the comparison value may be zero.

Example 11: The method of Example 10, where (1) the Boolean predication value may be set to the first value when the representative value is not equal to the comparison value, and (2) the Boolean predication value may be set to the second value when the representative value is equal to the comparison value.

Example 12: The method of Example 1, where the comparison value may be non-zero.

Example 13: The method of Example 12, where (1) the Boolean predication value may be set to the first value when the representative value is greater than or equal to the comparison value, and (2) the Boolean predication value may be set to the second value when the representative value is less than the comparison value.

Example 14: The method of any one of Examples 1 through 13, where the input of the node may include an output of an activation operation of another node of the ANN.

Example 15: The method of any one of Examples 1 through 13, where the method may further include (1) performing the next operation prior to evaluating the Boolean predication value, (2) saving, based on the next operation being dependent on the Boolean predication value, a result of performing the next operation without updating the state of the ANN, and (3) updating, based on the Boolean predication value being the first value, the state of the ANN using the result of performing the next operation.

Example 16: The method of any one of Examples 1 through 13, where the method may further include (1) performing, based on the next operation being dependent on the Boolean predication value, the next operation after determining the Boolean predication value is the first value, and (2) skipping, based on the next operation being dependent on the Boolean predication value, the next operation after determining the Boolean predication value is the second value.

Example 17: The method of any one of Examples 1 through 13, where the method may further include based on another operation of the plurality of operations being dependent on the Boolean predication value, (1) allowing, based on the Boolean predication value being the second value, the other operation to update the state of the ANN, and (2)

preventing, based on the Boolean predication value being the first value, the other operation from updating the state of the ANN.

Example 18: The method of Example 17, where performance of the next operation and the other operation may at least partially overlap in time.

Example 19: A hardware processing element that may include a plurality of hardware processing elements that process nodes of an artificial neural network (ANN), where at least one of the hardware processing elements includes (1) an operation unit that performs a plurality of operations associated with the nodes of the ANN and (2) a predication unit that (a) sets, as a result of a previous operation of the plurality of operations, a Boolean predication value to a first value or a second value different from the first value, where the previous operation includes comparing a representative value for one of a weight or an input of a node of the ANN to a comparison value, (b) determines whether a next operation of the plurality of operations is dependent upon the Boolean predication value, (c) based on the next operation not being dependent on the Boolean predication value, allows the next operation to update a state of the ANN, and (d) based on the next operation being dependent on the Boolean predication value, (i) allows, based on the Boolean predication value being the first value, the next operation to update the state of the ANN and (ii) prevents, based on the Boolean predication value being the second value, the next operation from updating the state of the ANN.

Example 20: A system that may include a plurality of hardware processing elements that process nodes of an artificial neural network (ANN), where at least one of the hardware processing elements includes: (1) an operation unit that performs a plurality of operations associated with the nodes of the ANN and (2) a predication unit that (a) sets, as a result of a previous operation of the plurality of operations, a Boolean predication value to a first value or a second value different from the first value, where the previous operation includes comparing a representative value for one of a weight or an input of a node of the ANN to a comparison value, (b) determines whether a next operation of the plurality of operations is dependent upon the Boolean predication value, (c) based on the next operation not being dependent on the Boolean predication value, allows the next operation to update a state of the ANN, and (d) based on the next operation being dependent on the Boolean predication value, (i) allows, based on the Boolean predication value being the first value, the next operation to update the state of the ANN and (ii) prevents, based on the Boolean predication value being the second value, the next operation from updating the state of the ANN.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, CPUs, Field-Programmable Gate Arrays (FPGAs) that implement softcore processors, ASICs, portions of one or more of the same, variations or combinations of one or more of the same, or any other suitable physical processor.

Although illustrated as separate elements, the modules described and/or illustrated herein may represent portions of a single module or application. In addition, in certain embodiments, one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive matrices to be transformed, transform the matrices, output a result of the transformation to produce partial sums, use the result of the transformation to produce an output matrix, and store the result of the transformation to perform an inference of a neural network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
setting, using at least one hardware processor, as a result of a previous operation of a plurality of operations of an artificial neural network (ANN), a Boolean predication value to a first value or a second value different from the first value, wherein the previous operation comprises comparing a representative value for one of a weight or an input of a node of the ANN to a comparison value;
determining whether a next operation of the plurality of operations of the ANN is dependent upon the Boolean predication value;
allowing, based on the next operation not being dependent on the Boolean predication value, the next operation to update a state of the ANN; and
based on the next operation being dependent on the Boolean predication value:
  allowing, based on the Boolean predication value being the first value, the next operation to update the state of the ANN; and
  preventing, based on the Boolean predication value being the second value, the next operation from updating the state of the ANN.

2. The method of claim 1, wherein:
the representative value of the one of a weight or an input of the node comprises an actual value of a weight of the node; and
the next operation comprises a multiply operation of the actual value of the weight and a value of an input associated with the weight.

3. The method of claim 1, wherein:
the representative value of the one of a weight or an input of the node comprises an actual value of an input of the node; and
the next operation comprises a multiply operation of the actual value of the input and a value of a weight associated with the input.

4. The method of claim 1, wherein:
the representative value of the one of a weight or an input of the node comprises an absolute value of a weight of the node; and
the next operation comprises a multiply operation of an actual value of the weight and a value of an input associated with the weight.

5. The method of claim 1, wherein:
the representative value of the one of a weight or an input of the node comprises an absolute value of an input of the node; and
the next operation comprises a multiply operation of an actual value of the input and a value of a weight associated with the input.

6. The method of claim 1, wherein:
the representative value of the one of a weight or an input of the node comprises an actual value of a weight of the node; and
the next operation comprises a summing operation including a product of the actual value of the weight and a value of an input associated with the weight that is part of an accumulate operation.

7. The method of claim 1, wherein:
the representative value of the one of a weight or an input of the node comprises an actual value of an input of the node; and
the next operation comprises a summing operation including a product of the actual value of the input and a value of a weight associated with the input that is part of an accumulate operation.

8. The method of claim 1, wherein:
the representative value of the one of a weight or an input of the node comprises an absolute value of a weight of the node; and
the next operation comprises a summing operation including a product of an actual value of the weight and a value of an input associated with the weight that is part of an accumulate operation.

9. The method of claim 1, wherein:
the representative value of the one of a weight or an input of the node comprises an absolute value of an input of the node; and
the next operation comprises a summing operation including a product of an actual value of the input and a value of a weight associated with the input that is part of an accumulate operation.

10. The method of claim 1, wherein the comparison value is zero.

11. The method of claim 10, wherein:
the Boolean predication value is set to the first value when the representative value is not equal to the comparison value; and
the Boolean predication value is set to the second value when the representative value is equal to the comparison value.

12. The method of claim 1, wherein the comparison value is non-zero.

13. The method of claim 12, wherein:
the Boolean predication value is set to the first value when the representative value is greater than or equal to the comparison value; and
the Boolean predication value is set to the second value when the representative value is less than the comparison value.

14. The method of claim 1, wherein the input of the node comprises an output of an activation operation of another node of the ANN.

15. The method of claim 1, further comprising:
performing the next operation prior to evaluating the Boolean predication value;
saving, based on the next operation being dependent on the Boolean predication value, a result of performing the next operation without updating the state of the ANN; and
updating, based on the Boolean predication value being the first value, the state of the ANN using the result of performing the next operation.

16. The method of claim 1, further comprising:
performing, based on the next operation being dependent on the Boolean predication value, the next operation after determining the Boolean predication value is the first value; and
skipping, based on the next operation being dependent on the Boolean predication value, the next operation after determining the Boolean predication value is the second value.

17. The method of claim 1, further comprising:
based on another operation of the plurality of operations being dependent on the Boolean predication value:
  allowing, based on the Boolean predication value being the second value, the other operation to update the state of the ANN; and preventing, based on the Boolean predication value being the first value, the other operation from updating the state of the ANN.

18. The method of claim 17, wherein performance of the next operation and the other operation at least partially overlap in time.

19. A hardware processing element comprising:
an operation unit that performs a plurality of operations associated with nodes of an artificial neural network (ANN); and
a predication unit that:
sets, as a result of a previous operation of the plurality of operations, a Boolean predication value to a first value or a second value different from the first value, wherein the previous operation comprises comparing a representative value for one of a weight or an input of a node of the ANN to a comparison value;
determines whether a next operation of the plurality of operations is dependent upon the Boolean predication value;
based on the next operation not being dependent on the Boolean predication value, allows the next operation to update a state of the ANN; and
based on the next operation being dependent on the Boolean predication value:
allows, based on the Boolean predication value being the first value, the next operation to update the state of the ANN; and
prevents, based on the Boolean predication value being the second value, the next operation from updating the state of the ANN.

20. A system comprising:
a plurality of hardware processing elements that process nodes of an artificial neural network (ANN), wherein at least one of the hardware processing elements comprises:
an operation unit that performs a plurality of operations associated with the nodes of the ANN; and
a predication unit that:
sets, as a result of a previous operation of the plurality of operations, a Boolean predication value to a first value or a second value different from the first value, wherein the previous operation comprises comparing a representative value for one of a weight or an input of a node of the ANN to a comparison value;
determines whether a next operation of the plurality of operations is dependent upon the Boolean predication value;
based on the next operation not being dependent on the Boolean predication value, allows the next operation to update a state of the ANN; and
based on the next operation being dependent on the Boolean predication value:
allows, based on the Boolean predication value being the first value, the next operation to update the state of the ANN; and
prevents, based on the Boolean predication value being the second value, the next operation from updating the state of the ANN.

* * * * *